United States Patent
Bakulin et al.

(10) Patent No.: US 11,781,416 B2
(45) Date of Patent: Oct. 10, 2023

(54) DETERMINATION OF ELASTIC PROPERTIES OF A GEOLOGICAL FORMATION USING MACHINE LEARNING APPLIED TO DATA ACQUIRED WHILE DRILLING

(71) Applicant: Saudi Arabian Oil Company, Dhahran (SA)

(72) Inventors: Andrey Bakulin, Dhahran (SA); Robert Smith, Dhahran (SA); Stanislav Glubokovskikh, Maylands (AU)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/612,645

(22) PCT Filed: Oct. 16, 2019

(86) PCT No.: PCT/RU2019/000738
§ 371 (c)(1),
(2) Date: Nov. 11, 2019

(87) PCT Pub. No.: WO2021/075994
PCT Pub. Date: Apr. 22, 2021

(65) Prior Publication Data
US 2021/0140298 A1   May 13, 2021

(51) Int. Cl.
*E21B 44/00* (2006.01)
*E21B 49/00* (2006.01)
(Continued)

(52) U.S. Cl.
CPC ........... *E21B 44/00* (2013.01); *E21B 49/003* (2013.01); *G01V 1/46* (2013.01); *G01V 1/50* (2013.01);
(Continued)

(58) Field of Classification Search
CPC .......... E21B 44/00; G06N 20/00; G01V 1/46; G01V 1/50; G06K 9/6232; G06K 9/6267
See application file for complete search history.

(56) References Cited

U.S. PATENT DOCUMENTS

| | | | |
|---|---|---|---|
| 5,578,539 A | 11/1996 | Glaubitt et al. | |
| 8,082,104 B2* | 12/2011 | de Reynal | E21B 49/003 702/9 |

(Continued)

FOREIGN PATENT DOCUMENTS

| | | |
|---|---|---|
| CN | 102575516 | 7/2012 |
| WO | WO 2018048934 | 3/2018 |

OTHER PUBLICATIONS

StuartReid, 10 misconceptions about Neural networks, 2014.*
(Continued)

*Primary Examiner* — Alexander Satanovsky
*Assistant Examiner* — Lynda Dinh
(74) *Attorney, Agent, or Firm* — Fish & Richardson P.C.

(57) ABSTRACT

Methods for determination of elastic properties of geological formations using machine learning include extracting a first feature vector from data acquired during drilling. The data includes at least drilling parameters. The first feature vector is indicative of a drilling environment classification. A machine learning classification algorithm determines the drilling environment classification based on the first feature vector. A machine learning regression algorithm is selected from multiple machine learning regression algorithms based on the drilling classification. A second feature vector is extracted from the data acquired during drilling based on the drilling classification and the selected machine learning regression algorithm. The second feature vector is indicative of elastic properties of a geological formation. The selected machine learning regression algorithm determines the elas- (Continued)

tic properties of the geological formation based on the second feature vector.

20 Claims, 12 Drawing Sheets

(51) Int. Cl.
  *G06N 20/00* (2019.01)
  *G01V 1/46* (2006.01)
  *G01V 1/50* (2006.01)
  *G06F 18/24* (2023.01)
  *G06F 18/213* (2023.01)
(52) U.S. Cl.
  CPC ............ *G06F 18/213* (2023.01); *G06F 18/24* (2023.01); *G06N 20/00* (2019.01)

(56) References Cited

U.S. PATENT DOCUMENTS

| | | | |
|---|---|---|---|
| 9,187,984 | B2 | 11/2015 | Usadi et al. |
| 9,297,251 | B2* | 3/2016 | Poitzsch ................. E21B 47/07 |
| 9,659,239 | B2* | 5/2017 | Matsunaga .......... G06K 9/6234 |
| 9,747,393 | B2 | 8/2017 | Dasari |
| 10,132,162 | B2 | 11/2018 | Neale et al. |
| 10,242,312 | B2 | 3/2019 | Storm, Jr. |
| 10,424,312 | B2 | 9/2019 | Kordon et al. |
| 11,112,513 | B2 | 9/2021 | Khadhraoui et al. |
| 2013/0075161 | A1 | 3/2013 | Yang |
| 2015/0356403 | A1 | 12/2015 | Storm, Jr. |
| 2016/0307312 | A1* | 10/2016 | Sungkorn ............. G06T 7/0004 |
| 2018/0075343 | A1 | 3/2018 | Van den Oord et al. |
| 2019/0169986 | A1 | 6/2019 | Storm et al. |
| 2019/0180165 | A1 | 6/2019 | Vinyals et al. |
| 2019/0266501 | A1* | 8/2019 | Tavares ................ G01V 99/005 |
| 2020/0088897 | A1* | 3/2020 | Roy ........................ G01V 1/282 |
| 2020/0109618 | A1* | 4/2020 | Flanagan ................ E21B 44/02 |
| 2022/0187493 | A1 | 6/2022 | Smith et al. |

OTHER PUBLICATIONS

PCT International Search Report and Written Opinion issued in International Application No. PCT/RU2019/000738 dated Jun. 3, 2020, 17 pages.
Gowida et al., "A Hybrid Artificial Intelligence Model to Predict the Elastic Behavior of Sandstone Rocks," Sustainability 11:19 (1-22), Sep. 25, 2019, 22 pages.
Jamshidi et al., "Real-time Estimation of Elastic Properties of Formation Rocks Based on Drilling Data by Using an Artificial Neural Network," Energy Sources, Part A, Recovery, Utilization and Environmental Effects, 35:4 (337-351), Jan. 11, 2013, 16 pages.
Armenta, "Identifying Inefficient Drilling Conditions Using Drilling-Specific Energy," ATCE 2008, SPE Annual Technical Conference and Exhibition, vol. 7, Denver, Colorado, Sep. 2008, pp. 4409-4424, 16 pages.
Breiman, "Random Forests," Machine Learning. vol 45, issue 1, pp. 5-32, Oct. 2001, 28 pages.
Hareland et al, "Calculating Unconfined Rock Strength from Drilling Data," Proceedings of the 1st Canada-US Rock Mechanics Symposium—Rock Mechanics Meeting Society's Challenges and Demands (2007, Vancouver, BC, Canada), vol. 2, pp. 1717-1723, Society of Petroleum Engineers (SPE), May 2007, 7 pages.
Hastie et al, "The Elements of Statistical Learning: Data Mining, Inference, and Prediction," Springer Science & Business Media, Nov. 2013, New York, 764 pages.
Lutz et al. "Instantaneous Logging Based on a Dynamic Theory of Drilling," Journal of Petroleum Technology, 24(6), 750-758, Jun. 1972, 9 pages.
Macpherson et al, "A Framework for Transparency in Drilling Mechanics and Dynamics Measurements," SPE Annual Technical Conference and Exhibition. Houston, Texas, USA: Society of Petroleum Engineers, Sep. 2015, 28 pages.
Teale, "The concept of specific energy in rock drilling," International Journal of Rock Mechanics and Mining Sciences & Geomechanics Abstracts vol. 2, Issue 1, Mar. 1965, pp. 57-73, 17 pages.
Bai et al., "An empirical evaluation of generic convolutional and recurrent networks for sequence modeling," 2018, 14 pages.
Bergstra et al., "Algorithms for hyper-parameter optimization," In Advances in neural information processing systems, 2011, 2546-2554, 9 pages.
Esmaeili et al., "Experimental Evaluation of Real-Time Mechanical Formation Classification using Drill String Vibration Measurement," SPE-158933-MS, SPE Annual Technical Conference and Exhibition, Oct. 2012, San Antonio, Texas, USA, 13 pages.
Fenwick et al., "Quantifying asymmetric parameter interactions in sensitivity analysis: application to reservoir modeling," Mathematical Geosciences, 2014, 46(4):493-511, 19 pages.
Fisher et al., "All Models are Wrong, but Many are Useful: Learning a Variable's Importance by Studying an Entire Class of Prediction Models Simultaneously," Journal of Machine Learning Research, 2019, 20(177):1-81, 81 pages.
Gan et al., "Artificial Intelligent Logs for Formation Evaluation Using Case Studies in Gulf of Mexico and Trinidad & Tobago," In SPE Annual Technical Conference and Exhibition, Society of Petroleum Engineers, Sep.-Oct. 2019, 13 pages.
He et al., "Deep residual learning for image recognition," In Proceedings of the IEEE conference on computer vision and pattern recognition, 2016, 770-778, 9 pages.
Moazzeni et al., "Artificial intelligence for lithology identification through real-time drilling data," Journal of Earth Science & Climatic Change, 2015, 6(3):1-4, 4 pages.
Myers et al., "Drillstring vibration: A Proxy for Identifying Lithologic Boundaries While Drilling," Proceedings of the Ocean Drilling Program, Scientific Results, 2002, 179, 17 pages.
Parapuram et al., "An artificially intelligent technique to generate synthetic geomechanical well logs for the Bakken Formation," Energies, 2018, 11(3):680, 26 pages.
Park et al., "DGSA: A Matlab toolbox for distance-based generalized sensitivity analysis of geoscientific computer experiments," Computers & geosciences, 2016, 97, 15-29, 15 pages.
Szegedy et al., "Going deeper with convolutions," In Proceedings of the IEEE conference on computer vision and pattern recognition, 2015, 1-9, 9 pages.
Van den Oord et al., "Wavenet: A generative model for raw audio," Sep. 2016, 15 pages.
Wolcott et al., "Lithology Determination Using Downhole Bit Mechanics Data," SPE 26492, 68th Annual Technical Conference and Exhibition of the Society of Petroleum Engineers held in Houston, Texas, Oct. 1993, 10 pages.
Zhang et al., "Synthetic well logs generation via Recurrent Neural Networks," Petroleum Exploration and Development, 2018, 45(4):29-639, 11 pages.
PCT International Search Report and Written Opinion in International Application No. PCT/US2021/062599, dated Apr. 5, 2022, 15 pages.
Jamishidi et al., "Real time estimation of elastic properties of formation rocks based on drilling data by using an artificial neural network," Energy Sources, Part A, Jan. 2013, 35(4):337-351, 17 pages.
Klyuchnikov et al., "Data driven model for the identification of the rock type at a drilling bit," Journal of Petrolem Science and Engineering, 2019, 24 pages.
Osarogiagbon et al., "Gamma ray log generation from drilling parameters using deep learning," Journal of Petroleum Science and Engineering, Sep. 2020, 195:107906, 17 pages.
Pelletier et. al., "Temporal Convolutional Neural Network for the Classification of Satellite Image Time Series," MDPI Publication, Feb. 26, 2019, 11(5): 1-25.

* cited by examiner

DETERMINATION OF ELASTIC PROPERTIES OF A GEOLOGICAL FORMATION USING MACHINE LEARNING APPLIED TO DATA ACQUIRED WHILE DRILLING

TECHNICAL FIELD

This description relates generally to determining properties of a geological formation, for example, elastic properties of the geological formation.

BACKGROUND

Traditional methods used to drill wells are sometimes inefficient because of the drilling program design or missteps by a drilling crew. Inefficient drilling can result in extra rig time, the need to mitigate incidents, or a greater drilling cost.

SUMMARY

Methods for determining elastic properties of a geological formation using machine learning include using a computer system to extract a first feature vector from data acquired during drilling. The data acquired during drilling includes drilling parameters. In some implementations, the data acquired during drilling further includes logging while drilling logs and bit vibrations. The first feature vector is indicative of a drilling environment classification. A machine learning classification algorithm of the computer system determines the drilling environment classification based on the first feature vector. The computer system selects a machine learning regression algorithm from multiple machine learning regression algorithms based on the drilling environment classification. The computer system extracts a second feature vector from the data acquired during drilling. The second feature vector is based on the drilling environment classification and the selected machine learning regression algorithm. The second feature vector is indicative of elastic properties of a geological formation. The selected machine learning regression algorithm determines the elastic properties of the geological formation based on the second feature vector. A display device of the computer system generates a graphical representation of the elastic properties of the geological formation.

DETAILED DESCRIPTION

Figure 1:
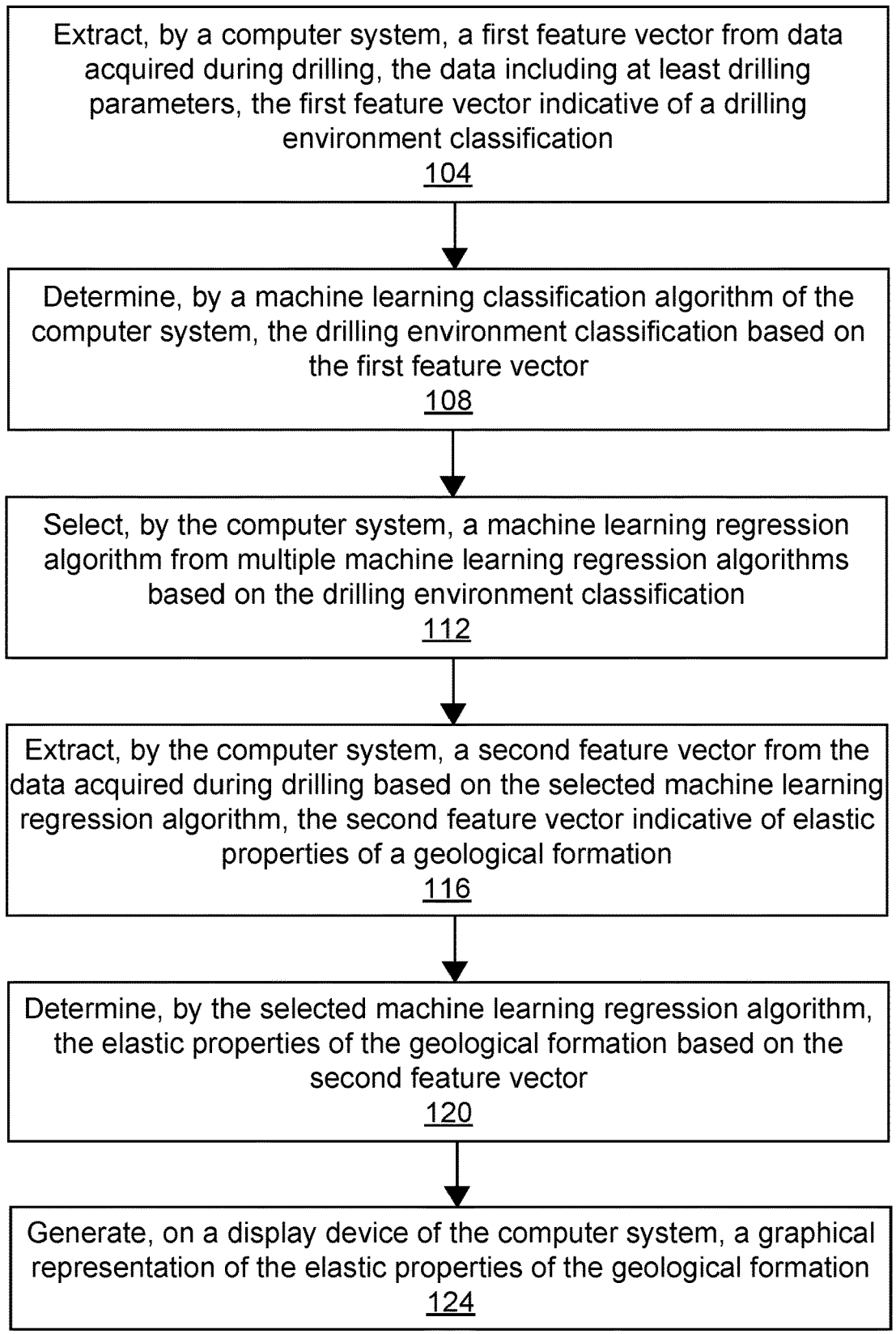
FIG. 1 illustrates a process for determining elastic properties of a geological formation using machine learning, in accordance with one or more implementations.

Drilling a borehole is a complex process that can be affected by a non-optimal drilling program or mistakes made by a drilling crew. Moreover, a drilling process can be inefficient. Inefficient drilling refers to the case where a majority of the energy applied is not used for destruction of the rock. Efficient drilling, on the other hand, refers to the case where the majority of the energy applied is used for destruction of the rock. Drilling inefficiencies result in extra rig time and require mitigation of adverse incidents, escalating the cost of drilling. The implementations disclosed provide methods, apparatus, and systems for determining elastic properties of rocks or geological formations while drilling. In some implementations, the prediction is based on drilling parameters (surface, downhole, or both). In other implementations, logging while drilling logs, bit vibrations, or both are also used. A suite of machine learning algorithms are generated that perform a two-step method. First, a particular drilling environment classification is determined from the observed response to drill bit penetration through a rock. In some implementations, the drilling environment classification is used to determine the type of geological formation. The identification of the drilling environment classification is used to select an appropriate machine learning algorithm to predict the elastic properties. The intermediate drilling environment classification step increases the robustness of the elastic property estimates during inefficient or suboptimal drilling when drilling measurements are dominated by noise from drilling dysfunctions.

Among other benefits and advantages, the implementations disclosed provide a flexible and integrated framework for determining elastic properties of a geological formation. The implementations provide improved analysis of data that is routinely acquired while drilling. The determination of the elastic properties is achieved at a reduced cost compared to conventional methods. Control over the subsurface elastic properties leads to drilling optimization. The implementations characterize the mechanical rock properties at the bit while drilling without the need for direct measurements, such as wireline acoustic logs. The implementations can be applied to automatic identification of an upper layer of a geological formation when only drilling parameters are available. The implementations can be applied to reservoir sections for which reduced-cost logging while drilling logs and drilling parameters can be used to obtain synthetic acoustic logs (mechanical property logs) without the need for acoustic logging while drilling logs or wireline logs. The implementations can also be applied to characterize overburden in a cost-effective manner for exploration. For example, generating synthetic logs and calibrating existing velocity models can be performed using reduced-cost substitutes in the form of drilling parameters, drilling parameters and logging while drilling logs, or drilling parameters and logging while drilling logs and bit vibrations.

FIG. 1 illustrates a process for determining elastic properties of a geological formation, in accordance with one or more implementations. The process represents a data assimilation workflow based on a suite of machine learning algorithms applied to drilling parameters, bit vibrations, and logging while drilling logs. In some implementations, the process is performed by the computer system illustrated and described in more detail with reference to FIG. 8.

In step 104, the computer system extracts a first feature vector from data acquired during drilling. The data includes at least drilling parameters. In some implementations, the data acquired during drilling also includes logging while drilling logs (such as a Gamma Ray log or a Neutron log), bit vibrations, or both. The drilling parameters include a rotational drilling speed, a mud motor speed, a rate of penetration, a drilling torque, an area of a drill bit, a weight on bit, a temperature of a drilling mud, a weight of the drilling mud, a nozzle diameter of the drill bit, and a number of cutters of the drill bit. A particular rock type or geological formation is identified in the observed response to drill bit penetration through a rock. The observed response to the drill bit penetration through the rock is related to mechanical properties, such as strength and brittleness of the rock. The drilling parameters are routinely measured and recorded at drilling rigs in order to control the drilling process. The drilling parameters are measured at the surface (at the rig), or downhole, or both. The drilling parameters are referred to as "surface" and "downhole" drilling parameters. The process is performed in real time (while drilling) and the drilling parameters are transmitted to a surface computer via mud-pulse, wired pipe, or any other type of telemetry. The surface computer is implemented as illustrated with reference to FIG. 8.

The first feature includes the drilling dynamics of the drilling process, such as bit vibrations. The drilling dynamics are related to the elastic properties of the rock being drilled. For example, using a set of controlled drilling parameters, a drill bit penetrates slower through a more resilient rock. The computer system is used to model relationships between the rate of penetration and the drilling dynamics to predict the elastic properties. The bit vibrations can include the near-bit vibrations response recorded by a near-bit downhole tool. The bit vibrations can include surrogate vibration measurements obtained by vibration sensors deployed at the drillstring. The surrogate vibration measurements capture bit vibrations propagating along a transmission, channel, or conduit represented by the drillstring. The bit vibrations can include vibrations measured at the surface by a top dive sensor or a surface sub located above the derrick floor.

The first feature vector is indicative of a drilling environment classification. The drilling environment classification represents a set of latent variables introduced to segment the subsurface conditions into units used to predict the elastic properties. The drilling environment classification is related to real-world drilling conditions in which only a portion of the surface rig energy is converted into the destruction of the rock by the bit. Only the portion of the energy converted therefore correlates to the elastic properties of the rock. The drilling environment classification indicates the type of drilling instrumentation used (such as the bottom hole assembly design and the drillstring), the condition of the drilling instrumentation, the drilling protocol, and the type of the drilling fluid used.

An optimal set of drilling classes is selected according to several criteria. The drilling environment classification must be identifiable from the input data. The elastic properties within a drilling class must be predictable from the input data. In some implementations, the drilling environment classification is used to determine the type of geological formation. The optimal set of drilling classes selected coincides with geological units (such as geological formations or para-sequences) or rock types (such as porous sandy shale). For example, a drilling class can aggregate sandstone intervals or specific carbonates having a particular drilling dysfunction (such as stick-slip). "Stick-slip" refers to irregular drillstring rotation.

In step 108, the computer system uses a machine learning classification algorithm of the computer system to determine the drilling environment classification based on the first feature vector. The drilling environment classification is indicative of the drilling instrumentation used, the drilling regime, and the elastic properties of the geological formation. Thus, in steps 104 and 108, a subsurface interval of the geological formation is attributed to a particular drilling class according to the response of the subsurface interval to drill bit penetration, downhole measurements obtained from logging while drilling logs, and bit vibrations. The determined drilling environment classification is related to the amount of energy required to crush the rock by a drill bit and the rock elastic properties. The determination of the drilling environment classification, based on the first feature vector, leverages the capacity of machine learning algorithms to assimilate training datasets from offset wells into non-parametric predictors of the elastic properties.

In step 112, the computer system selects a machine learning regression algorithm from multiple machine learning regression algorithms based on the drilling environment classification. The computer system automatically selects an optimal machine learning regression algorithm to determine the elastic properties. In some implementations, an optimal machine learning regression algorithm and the parameters of the machine learning regression algorithm are determined by training using wireline logs, drilling parameters, bit vibrations, and logging while drilling logs obtained from offset wells. In other implementations, elastic properties of geological formations obtained from core data, identified geological formations, and geological interpretations are also used for training. The machine learning training processes and the selection of machine learning regression algorithms are illustrated and described in more detail with reference to FIGS. 6 and 7.

In step 116, the computer system extracts a second feature vector from the data acquired during drilling based on the drilling environment classification and the selected machine learning regression algorithm. The second feature vector is indicative of elastic properties of a geological formation. For example, the second feature vector indicates the elastic properties of the rocks in a geological formation by relating them to the acoustic emissions from the crushing of the rock masses. The second feature vector correlates the elastic properties to the energy of accelerations for the observed drilling parameters. The first feature vector and the second feature vector share the same input data. However, the input data is transformed into different predictive features. The feature vectors include combinations of directly measured parameters, such as $ROP^2$ and $\log(ROP) \times GR$. Here, "log (X)" denotes the natural logarithm of a value X, "ROP" denotes the rate of penetration, and "GR" denotes the intensity of passive Gamma Ray radiation measured by a logging while drilling tool.

In step 120, the computer system uses the selected machine learning regression algorithm to determine the elastic properties of the geological formation based on the second feature vector. The elastic properties include the compressional velocity, the shear velocity, the density, and the unconfined compressive strength. The elastic properties also include derivative properties, such as the Young's modulus and the Poisson's ratio. Other derivative properties of interest, such as porosity, can also be predicted using the implementations disclosed. During the machine learning training process, such derivative properties are included in the training datasets in the form of derivative logs. For example, porosity is derived from acoustic, electrical, and other wireline logs using known petrophysical relationships. Thus, the disclosed implementations can be used to directly predict derivative properties.

In step 124, the computer system generates a graphical representation of the elastic properties of the geological formation on a display device of the computer system (for example, the display device 824). The display device 824 is illustrated and described in more detail with reference to FIG. 8. In some implementations, the graphical representation portrays the unconfined compressive strength, the compressional velocity, and the shear velocity. In other implementations, the graphical representation also portrays the density, the Young's modulus, and the Poisson's ratio. The graphical representation can include text, pie charts, graphs, histograms, and numerical values.

Figure 2A:
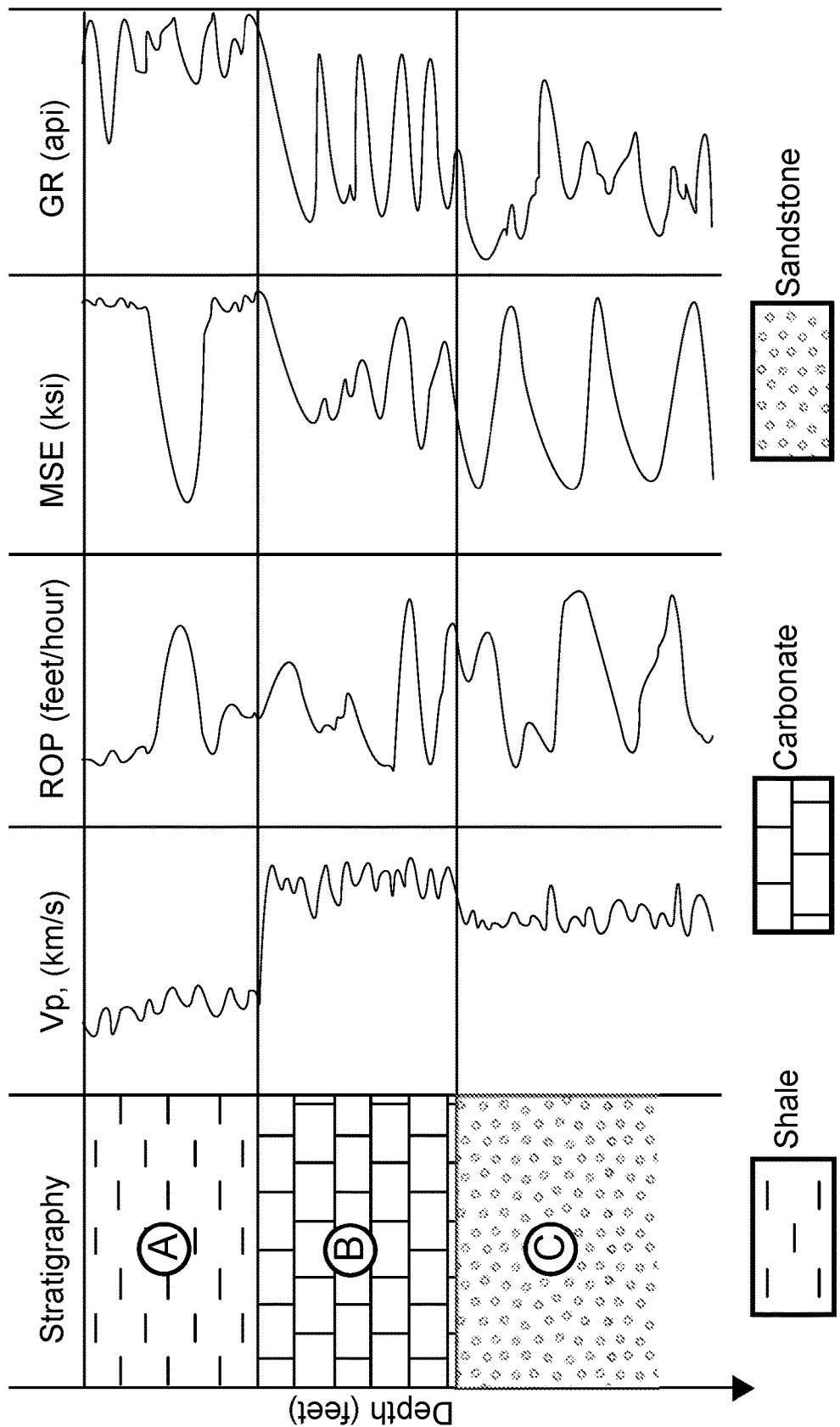
FIG. 2A illustrates an example response to drill bit penetration, in accordance with one or more implementations.

FIG. 2A illustrates an example response to drill bit penetration, in accordance with one or more implementations. An example geologic section is illustrated in FIG. 2A. The example geologic section includes three geological formations (A, B, and C) having different lithology. Each formation also has different values of compressional velocity ("Vp"), rate of penetration ("ROP"), and mean specific energy ("MSE"). Compressional velocity is measured in units of kilometers (km) per second (s). Rate of penetration is measured in units of feet per hour. Mean specific energy is measured in units of kilopounds per square inch (ksi). "GR" denotes the intensity of passive Gamma Ray radiation measured by a logging while drilling tool in radioactivity units (api). Because of the difference in lithology, the three formations have different average values of compressional velocity. Compressional velocity typically correlates to the mechanical properties of rocks.

The rate of penetration does not correspond to the compressional velocity in FIG. 2A, despite the fact that compressional velocity typically indicates the elastic properties of a rock. The rate of penetration does not correspond to the compressional velocity because of drilling inefficiencies during particular intervals when the drill bit is not fully engaged with the rock. In such intervals, the majority of the energy applied is not used for destruction of the rock. To detect intervals of drilling inefficiency, an amount of energy consumed by a drilling rig to crush a unit volume of rock (the mean specific energy) is computed. The mean specific energy ("MSE") is computed as follows.

$$MSE = \frac{WOB}{A_B} + \frac{120 \times \pi \times RPM \times TOR}{A_B \times ROP} \quad (1)$$

In equation (1), "WOB" denotes the weight on bit, "$A_B$" denotes the area of the drill bit, "RPM" denotes the revolutions per minute, and "TOR" denotes the torque measured at the drilling rig.

Referring back to FIG. 2A, the drilling process is not reflected by the Gamma Ray measurements during drilling. The Gamma Ray log obtained during drilling reflects properties of the surrounding rocks, rather than the drilling conditions. However, as illustrated in FIG. 2A, a correlation of the compressional velocity to the Gamma Ray measurements is observable. In the disclosed implementations, the machine learning algorithms are trained to use the regression of the compressional velocity to the Gamma Ray measurements to predict the elastic properties of a geological formation.

Figure 2B:
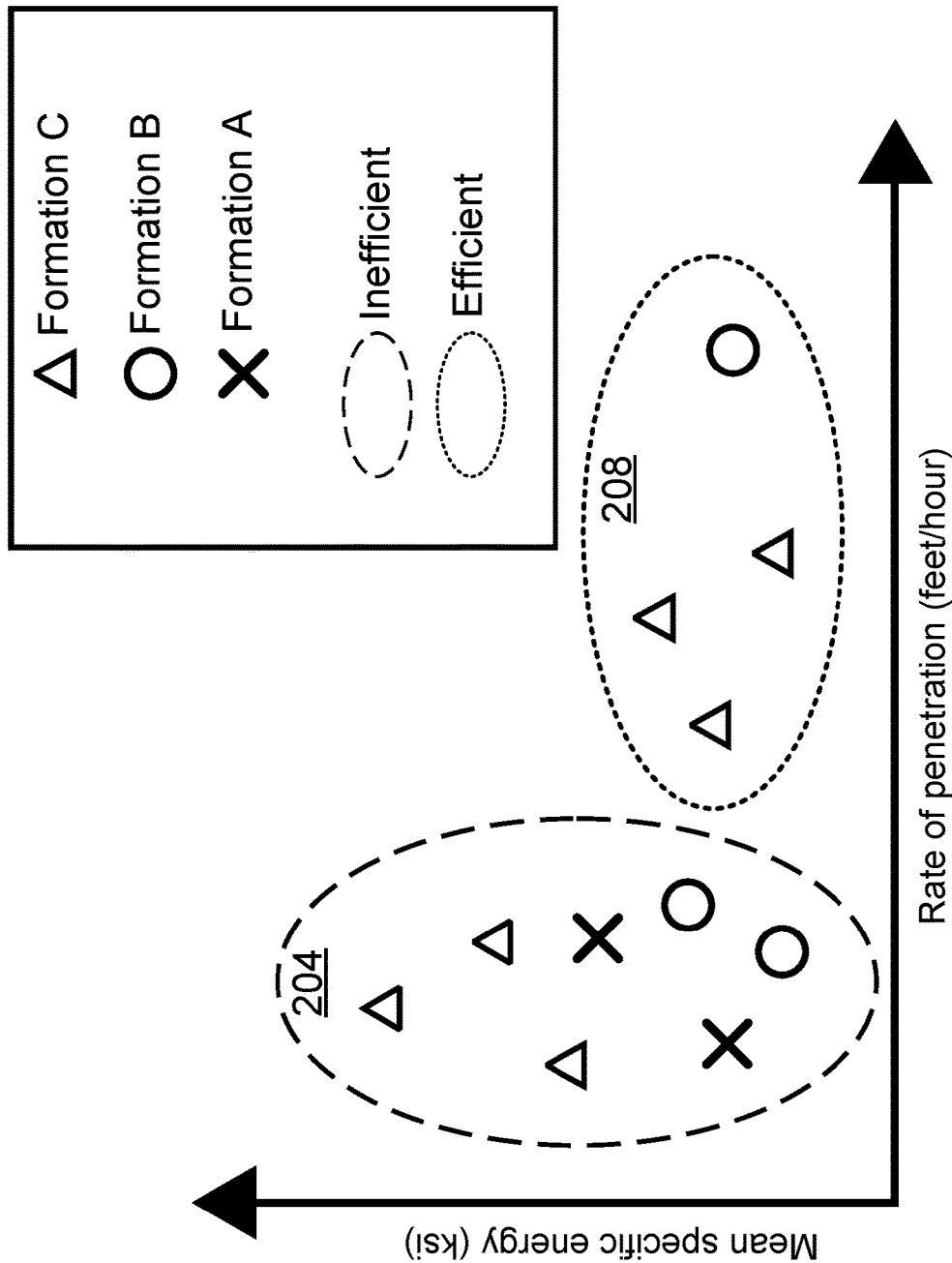
FIG. 2B illustrates an example cross-plot of mean specific energy against rate of penetration, in accordance with one or more implementations.

FIG. 2B illustrates an example cross-plot of mean specific energy against rate of penetration, in accordance with one or more implementations. The cross-plot of mean specific energy against rate of penetration in FIG. 2B includes two clusters 204 and 208. Cluster 204 indicates a drilling regime in which a majority of the energy applied is not used for destruction of the rock. Cluster 208 indicates a drilling regime in which a majority of the energy applied is used for destruction of the rock. In a well-controlled laboratory setting, the unconfined compressive strength of common rock types corresponds to the mean specific energy. In practice, however, the mean specific energy is several orders of magnitude greater than the unconfined compressive strength because of drilling inefficiencies when a majority of the energy applied is not used for crushing the rock.

Figure 2C:
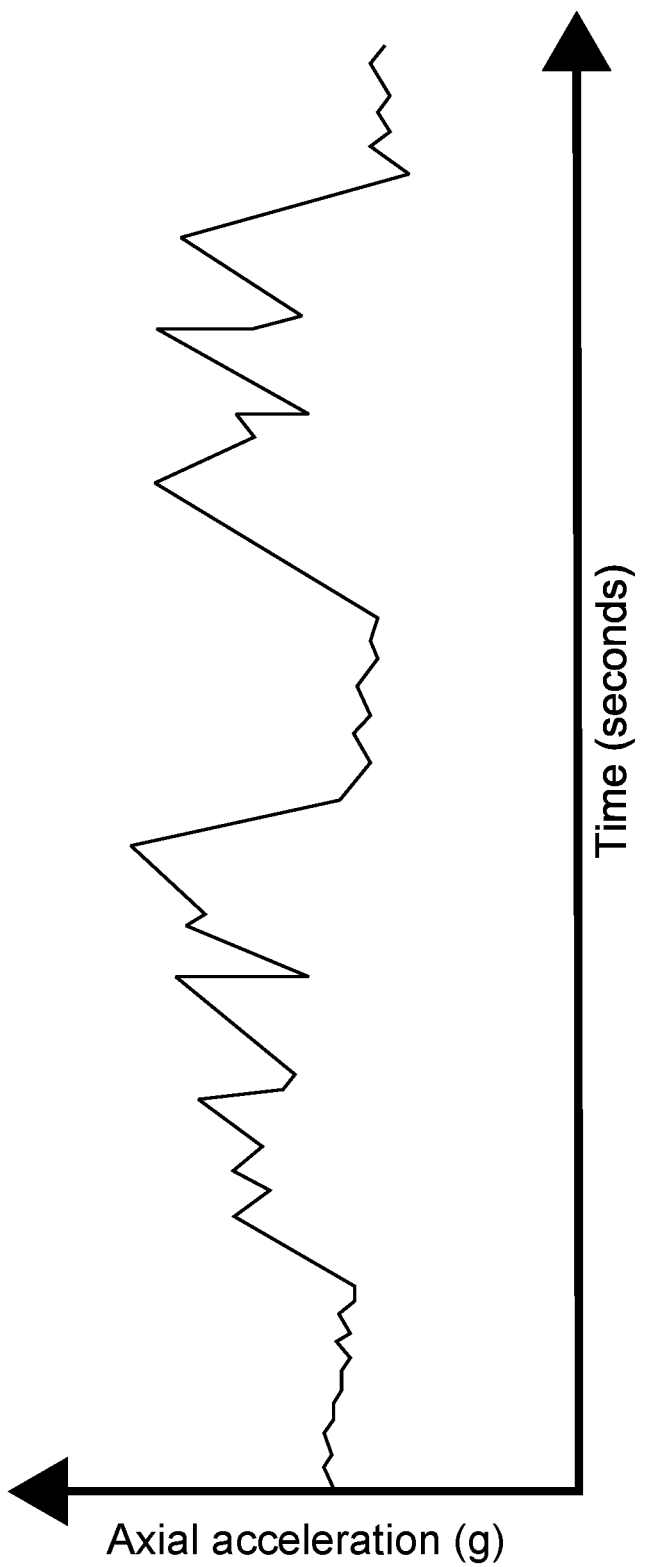
FIGS. 2C-E illustrate example plots of axial acceleration against time, in accordance with one or more implementations.
Figure 2D:
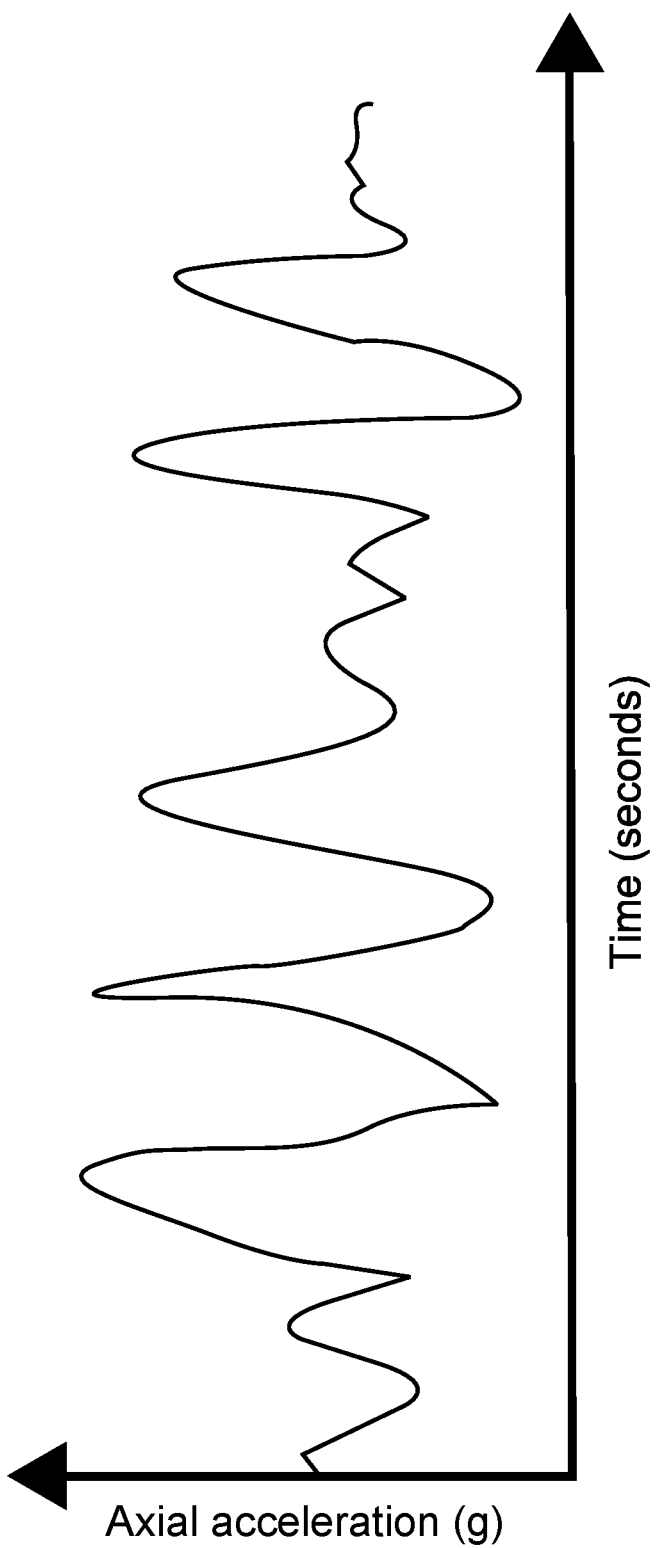
Figure 2E:
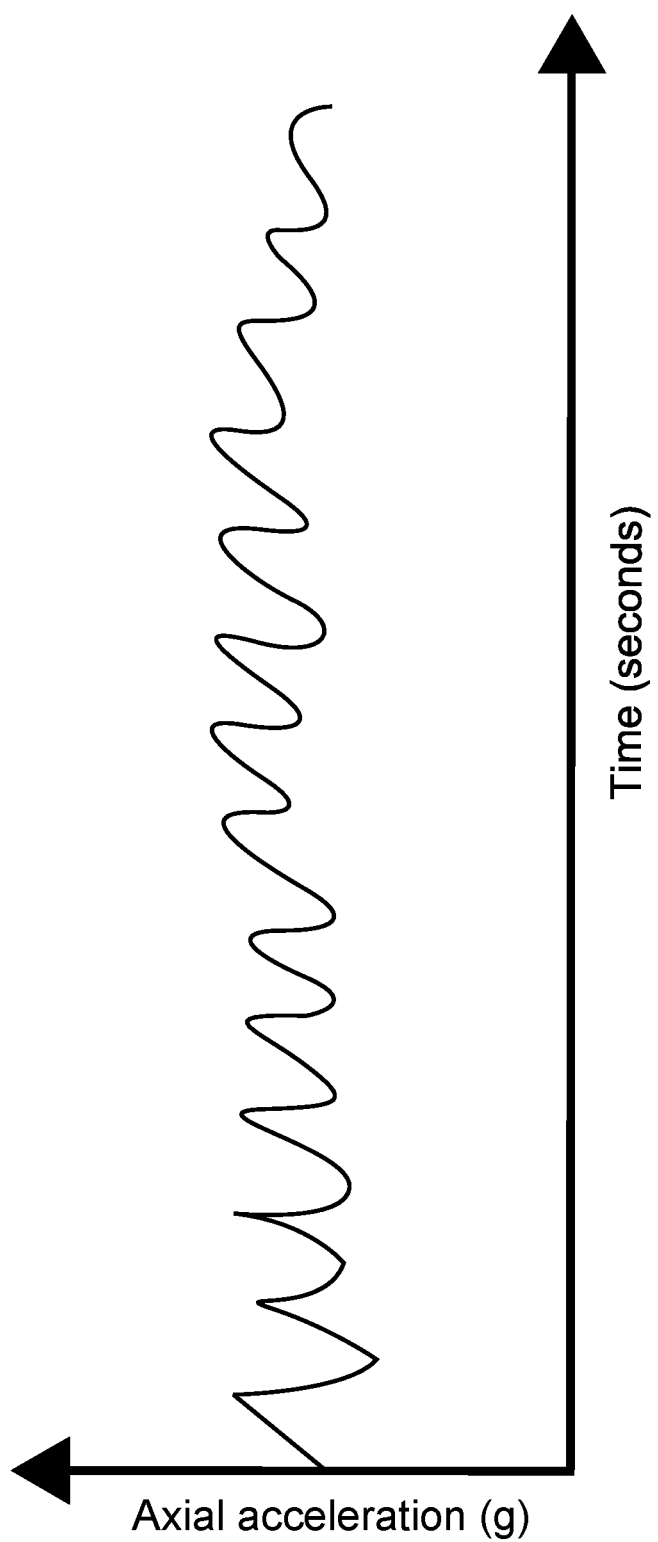

FIGS. 2C-E illustrate example plots of axial acceleration against time, in accordance with one or more implementations. The example plots indicate the response of a downhole axial accelerometer for hypothetical drilling incidents in a geological formation. The axial acceleration is measured in units of gravitational force equivalent (g).The axial acceleration is used to identify the causes of the MSE-ROP pairs observed within the clusters 204 and 208 illustrated in FIG. 2B. The causes of the MSE-ROP pairs indicate fully-developed stick-slip (illustrated in FIG. 2C), bit bouncing (illustrated in FIG. 2D), and normal drilling (illustrated in FIG. 2E). "Stick-slip" refers to irregular drillstring rotation. During stick-slip conditions, the vibration mode is torsional as the bit stops rotating momentarily at regular intervals causing the drillstring to periodically torque up and then spin free at several times the average surface revolutions per minute, causing damage to the bit and the bottomhole assembly. "Bit bounce" refers to the axial or longitudinal vibration of the drillstring that occurs with free-cone bits and hard-rock geological formations. In the implementations disclosed, the bit vibration measurements enrich the drilling parameters recorded because the bit vibrations contain signals related to the movement of instrumentation as well as the geological formations.

Figure 3:
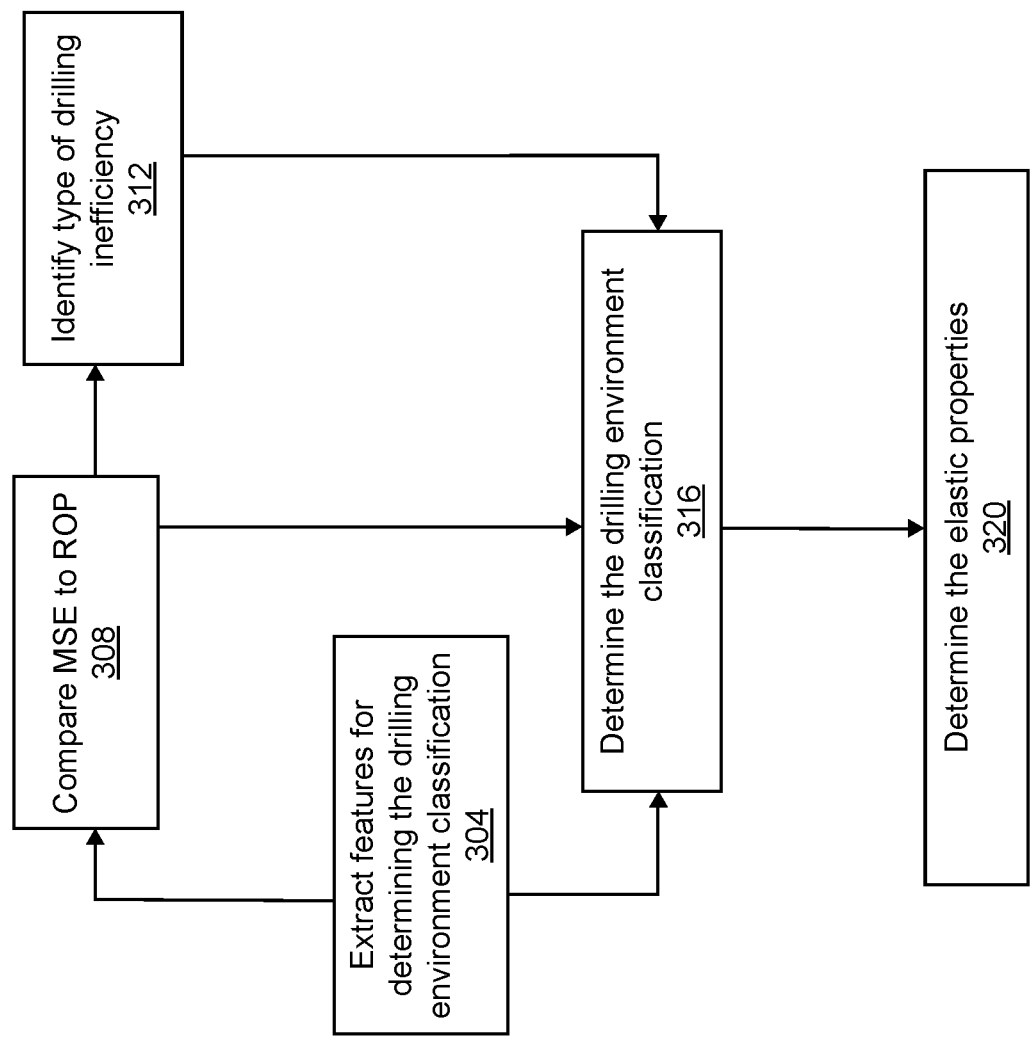
FIG. 3 illustrates a process for determining compressional velocity, in accordance with one or more implementations.

FIG. 3 illustrates a process for determining compressional velocity in accordance with one or more implementations. In some implementations, the process is performed by the computer system illustrated and described in more detail with reference to FIG. 8. The process illustrated in FIG. 3 was applied to the geological formations illustrated in FIG. 2A.

In step 304, the computer system extracts features for classifying the drilling conditions based on the drilling parameters and the bit vibrations. A logging while drilling log (such as a Gamma Ray log or a Neutron log) is not used for the geological formation classification, because of the overlap between geological formations B and C (as illustrated in FIG. 2A). In step 308, the computer system compares the mean specific energy ("MSE") to the rate of penetration ("ROP"). Based on the comparison, the computer system detects whether there are drilling inefficiencies in the drilling process. If drilling inefficiencies are detected, the computer system uses the drilling parameters and the bit vibrations to identify the particular type of drilling inefficiency in step 312. The drilling parameters and bit vibrations are described in more detail with reference to FIG. 1. For example, as discussed in more detail with reference to FIGS. 2C-E, at least three types of drilling inefficiency can be detected.

In step 316, the computer system uses the machine learning classification algorithm to determine a drilling environment classification, as illustrated and described in more detail with reference to FIG. 1. In some implementations, the drilling environment classification is used to determine the type of geological formation. If no drilling inefficiencies are detected in step 308, the process proceeds from step 308 to step 316. Thus, the features extracted from the drilling parameters are used to determine the drilling environment classification. In step 320, the computer system uses the machine learning regression algorithm to determine the elastic properties of a geological formation (identified by the drilling environment classification in step 316), as illustrated and described in more detail with reference to FIG. 1. Only logging while drilling logs (such as a Gamma Ray log or a Neutron log) are used for regression within the identified geological formation. The computer system predicts the compressional velocity using a best-fit regression between the compressional velocity and the logging while drilling measurements for the geological formation.

Figure 4:
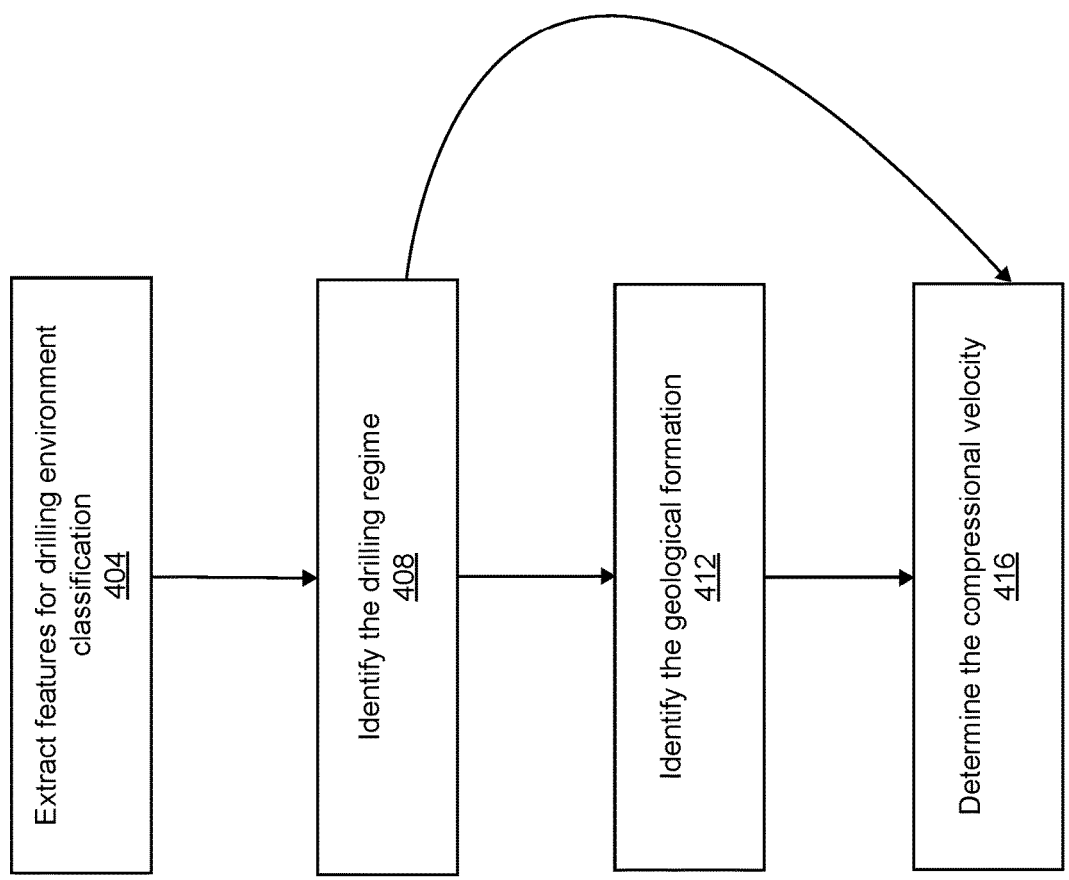
FIG. 4 illustrates a process for determining compressional velocity, in accordance with one or more implementations.

FIG. 4 illustrates a process for determining compressional velocity, in accordance with one or more implementations. In some implementations, the process is performed by the computer system illustrated and described in more detail with reference to FIG. 8. When the bit vibrations are not available (either because of an instrumentation failure or economic considerations), the process illustrated in FIG. 3 can be modified as illustrated in FIG. 4.

In step 404, the computer system extracts features from the drilling parameters for determining the drilling environment classification, as illustrated and described in more detail with reference to FIG. 1. The computer system does not determine whether there are drilling inefficiencies. In step 408, the computer system identifies a drilling regime in the drilling parameters. The drilling regime is a pattern extracted from the drilling parameters. The drilling regime can group the drilling parameters in accordance with properties of the drilling instrumentation used. The drilling regime can relate the drilling parameters to the bottom hole assembly configuration. The drilling regime can associate the drilling parameters to the drillstring configuration. The drilling regime can define a correspondence of the drilling parameters to the particular drilling conditions.

In step 412, the computer system identifies the geological formation that is being drilled based on the features and the drilling regime. In step 416, the computer system uses the machine learning regression algorithm to determine the compressional velocity. In some implementations, the compressional velocity is determined based on the average velocity of the geological formation. In other implementations, the compressional velocity is determined based on features extracted from logging while drilling logs (such as a Gamma Ray log or a Neutron log) and features of the geological formation identified in step 412. In other implementations, the compressional velocity is determined based on the drilling regime identified in step 408.

Figure 5:
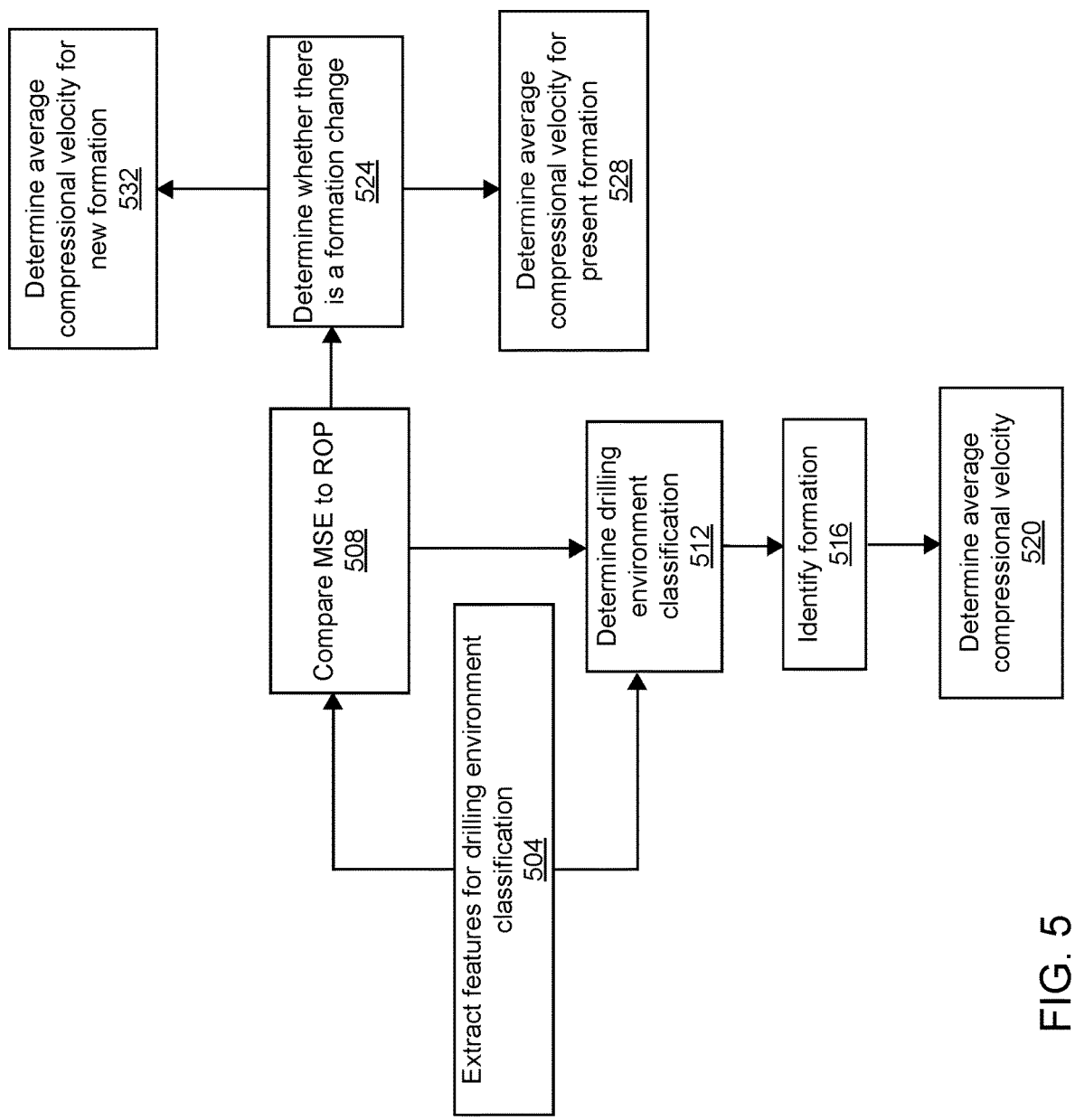
FIG. 5 illustrates a process for determining compressional velocity when logging while drilling logs are not available, in accordance with one or more implementations.

FIG. 5 illustrates a process for determining compressional velocity when logging while drilling logs (such as a Gamma Ray log or a Neutron log) and bit vibrations are not available during drilling. In some implementations, the process is performed by the computer system illustrated and described in more detail with reference to FIG. 8.

In step 504, the computer system extracts features from the drilling parameters for performing the drilling environment classification. For example, the drilling parameters can represent surface drilling parameters, downhole drilling parameters, or both. The drilling parameters include a rotational drilling speed, a mud motor speed, a rate of penetration, a drilling torque, an area of a drill bit, a weight on bit, a temperature of a drilling mud, a weight of the drilling mud, a nozzle diameter of the drill bit, and a number of cutters of the drill bit.

In step 508, the computer system compares the mean specific energy ("MSE") to the rate of penetration ("ROP") to detect the presence of drilling inefficiencies. The presence or absence of drilling inefficiencies is detected based on the ratio of the mean specific energy to the rate of penetration. The ratio of the mean specific energy to the rate of penetration is determined using downhole drilling parameters, surface drilling parameters, or both. If no drilling inefficiencies are detected, the computer system uses the machine learning classification algorithm to determine the drilling environment classification in step 512, as illustrated and described in more detail with reference to FIG. 1. The computer system identifies the type of geological formation in step 516. In some implementations, the drilling environment classification is used to determine the type of geological formation. For example, the geological formation can be shale, carbonate, or sandstone, as illustrated and described in more detail with reference to FIG. 2A. In step 520, the computer system determines the average compressional velocity for the geological formation based on the properties of the geological formation.

If the computer system detects the presence of drilling inefficiencies in step 508, the computer system determines whether the drilling inefficiencies are due to a change in the type of geological formation in step 524. For example, when transitioning from a less resilient rock to a more resilient rock, the rate of penetration decreases. The computer system determines whether the cause of the drilling inefficiency and the magnitude of the drilling inefficiency is likely to persist in the present geological formation. If the drilling inefficiency and the magnitude of the drilling inefficiency is likely to persist in the present geological formation, the computer system determines the average compressional velocity for the present geological formation in step 528. If the drilling inefficiency and the magnitude of the drilling inefficiency is likely to manifest in the new geological formation, the computer system determines the average compressional velocity for the new geological formation in step 532. The computer system determines the average compressional velocity because logging while drilling logs are not available. The variability of the compressional velocity is relatively less within a geological formation. Hence, the predicted compressional velocity can be approximated by the average value for the geological formation. The implementations disclosed use drilling parameters alone or in a combination with inexpensive surface and downhole measurements (such as a logging while drilling log or bit vibrations) to generate synthetic logs of the compressional velocity, the shear velocity, the unconfined compressive strength, or any other elastic property of interest. If the data acquired during drilling is available, the elastic properties are determined in real time, providing a foundation for drilling optimization.

Figure 6:
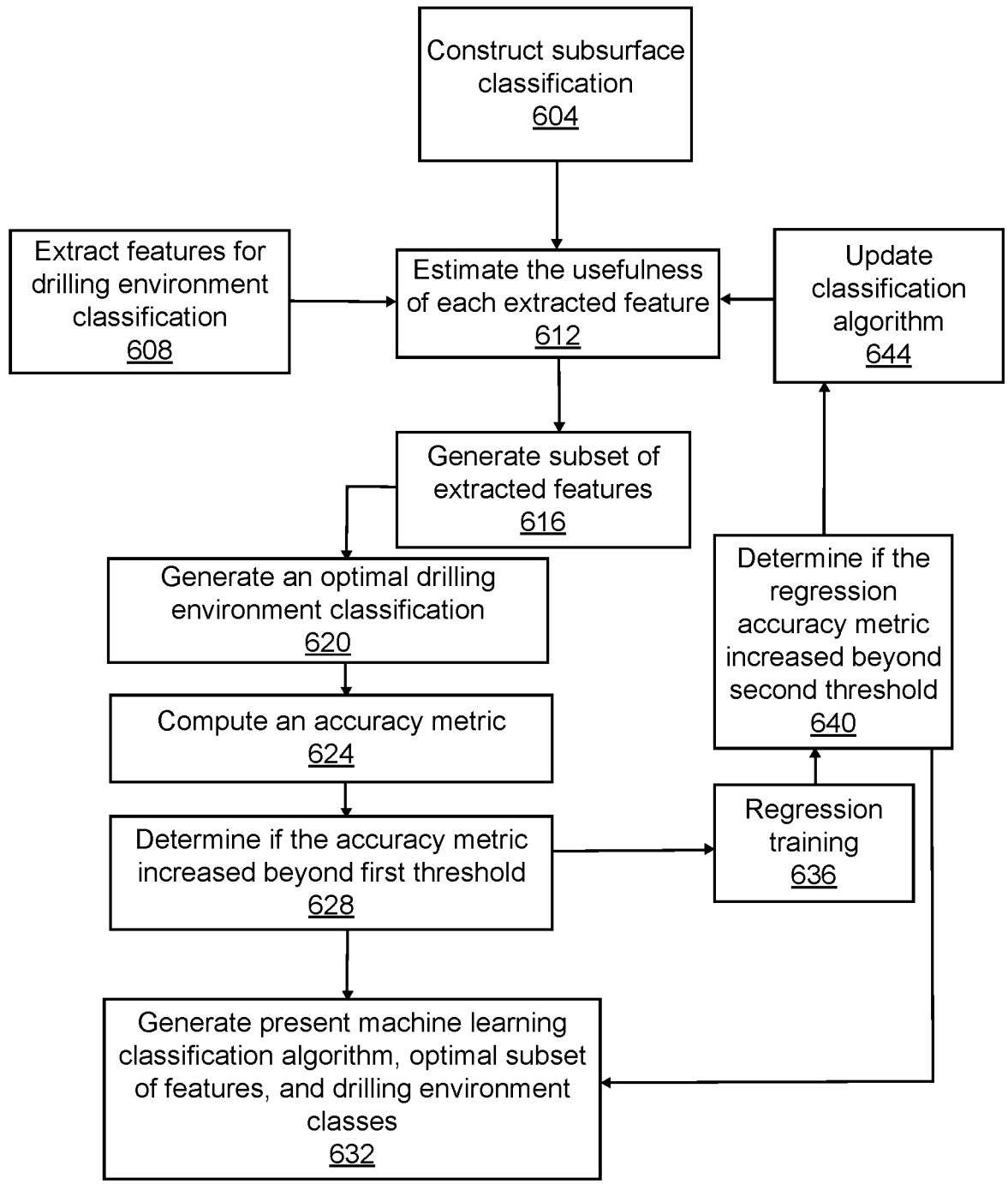
FIG. 6 illustrates a process for training a machine learning classification algorithm, in accordance with one or more implementations.

FIG. 6 illustrates a process for training a machine learning classification algorithm, in accordance with one or more implementations. In some implementations, the process is performed by the computer system illustrated and described in more detail with reference to FIG. 8.

In step 604, the computer system constructs an initial subsurface classification based on acoustic logs from offset wells and a vertical seismic profile of the geological formation. A geological model of the offset wells is also generated. The geological model is used as the "ground truth" during the training process illustrated in FIG. 6. The ground truth refers to the expected response of a supervised machine learning algorithm that estimates the usefulness of the input data (for example, the drilling parameters) and the predictive features derived from the data. The output of step 604 is a set of initial drilling classes generated by the computer system. In step 608, the computer system extracts features from the input data from the offset wells. The features are extracted for classification of the subsurface formation. The input data includes drilling parameters, bit vibrations, and logging while drilling logs (such as a Gamma Ray log or a Neutron log), as described in more detail with reference to FIG. 1.

In step 612, the computer system uses the machine learning classification algorithm to estimate the usefulness of each extracted feature with respect to the subsurface classification. Features that do not correlate to the subsurface classification are assigned a lesser rank than features that correlate to the subsurface classification. In some implementations, the drilling environment classification is used to determine the type of geological formation. In the implementation of the process illustrated in FIG. 6, a machine learning classification algorithm is used for extraction of the features, estimation of the usefulness of each feature, and computation of an accuracy metric for the drilling environment classification performed for a given subset of features. The accuracy metric is a specific quantitative metric of the goodness-of-fit. The "goodness of fit" defines the extent to which the determined drilling environment classification and geological formation match the reference (expected) value. For example, the goodness of fit can be a value ranging from 0 to 1, such as 0.78. Here, the value 0 indicates that the determined drilling environment classification and geological formation do not match the reference (expected) value. The value 1 indicates that the determined drilling environment classification and geological formation exactly match the reference (expected) value. The process illustrated in FIG. 6 terminates when the goodness of fit is reached either in step 628 or in step 640. In practice, the goodness of fit is selected in accordance with the quality of the available input data (step 608) and a level of accuracy specified by the drilling objectives. For example, if the available input data includes sonic logs, the goodness of fit is selected in accordance with the standard deviation of the determined compressional and shear velocities from the reference (expected) values (step 640). If the training datasets include sonic logs that are noisy (including outliers), the goodness of fit is selected in accordance with a reduced threshold standard deviation.

The training process illustrated in FIG. 6 determines an optimal subset of the features (when the goodness of fit is reached) and updates the internal parameters of the machine learning classification algorithm in accordance with the optimal subset of the features. In some implementations, the training process illustrated in FIG. 6 is iteratively applied to each of multiple, different machine learning classification algorithms. An optimal machine learning classification algorithm is selected based on the accuracy metric (using the goodness of fit criteria).

In step 616, the computer system uses the machine learning classification algorithm to generate a subset of features based on the usefulness of each extracted feature with respect to the subsurface classification. The machine learning classification algorithm establishes an internal data representation—classes and response patterns—to generate the subset of the features. The subset of the features are used with the latent variables—the drilling environment classification—to reduce the dimensionality of the problem. The response of the machine learning algorithms (such as the rock type, drilling conditions, and elastic properties) and the extracted features (such as the data values and their combinations) are grouped based on the usefulness of each extracted feature with respect to the subsurface classification.

In step 620, the computer system uses the subset of the features from step 616 to optimize the internal parameters of the machine learning classification algorithm. The optimized machine learning classification algorithm is used to refine the system of drilling classes. In step 624, the computer system computes an accuracy metric for the drilling environment classification. The accuracy of the machine learning classification algorithm in predicting the system of drilling classes is thus determined. In step 628, the computer system determines whether the accuracy metric for the machine learning classification algorithm in predicting the drilling environment classification has increased beyond a first threshold accuracy. The accuracy metric represents the extent to which the predicted drilling environment classification matches the reference (expected) value. For example, the first threshold accuracy can be a percentage value, such as 5%. If the accuracy metric did not increase beyond the first threshold accuracy, the computer system generates the present machine learning classification algorithm (with its internal parameters), the optimal subset of features, and the set of drilling classes as output in step 632.

In step 628, if the computer system determines that the accuracy metric for the machine learning classification algorithm in predicting the drilling environment classification increased beyond the first threshold accuracy, the computer system performs regression training using data from the offset wells in step 636. In step 640, the computer system determines whether a regression accuracy metric increased beyond a second threshold accuracy. For example, the second threshold accuracy can be a percentage value, such as 3%. The regression accuracy metric represents the extent to which the determined elastic properties match reference (expected) elastic properties. The regression accuracy metric is similar to the accuracy metric for the drilling environment classification described previously. If the regression accuracy metric increased beyond the second threshold accuracy, the computer system replaces the present version of the machine learning classification algorithm with the new version of the algorithm (the new internal parameters for which the accuracy metric increase was determined) in step 644. The iterative updating continues as long as the combination of new input features, new internal parameters, and new drilling classes results in improvements of the performance of the algorithm. If the regression accuracy metric does not increase beyond the second threshold accuracy in step 640, the process terminates in step 632.

Figure 7:
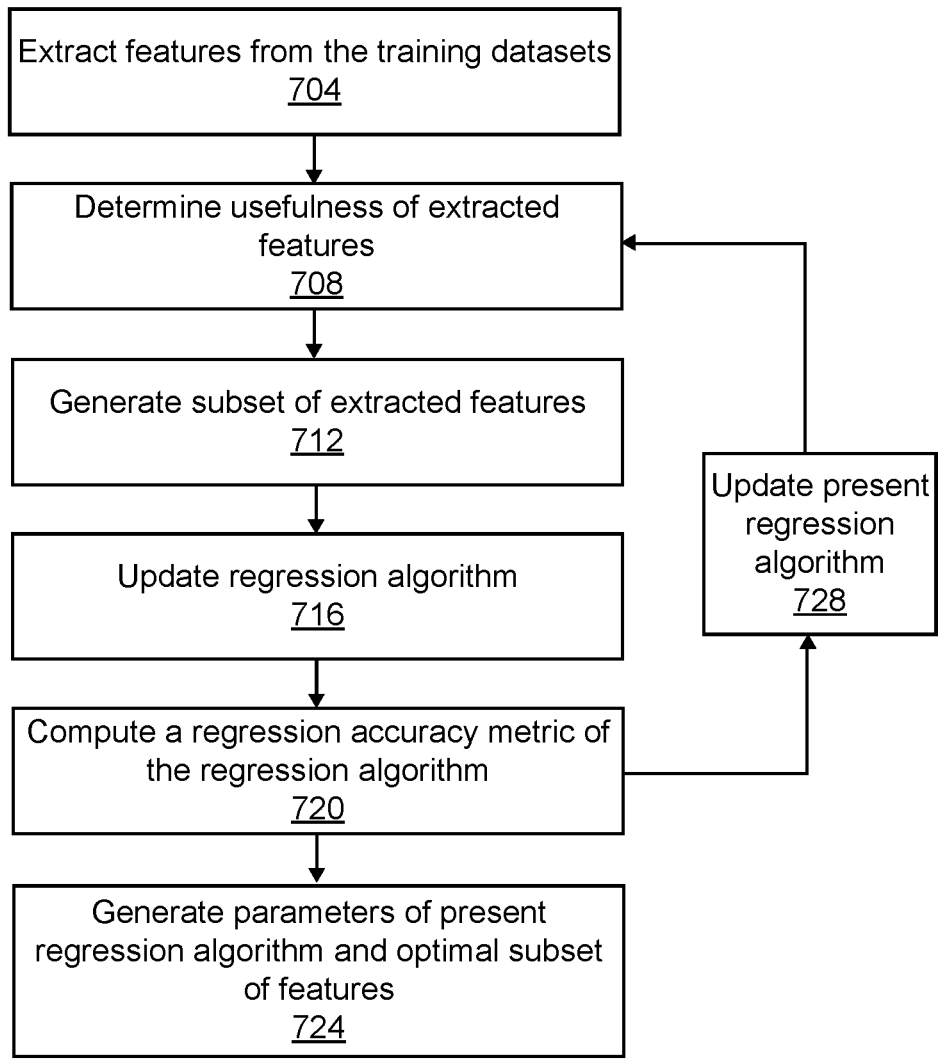
FIG. 7 illustrates a process for training a machine learning regression algorithm for determining elastic properties, in accordance with one or more implementations.

FIG. 7 illustrates a process for training a machine learning regression algorithm, in accordance with one or more implementations. In some implementations, the process is performed by the computer system illustrated and described in more detail with reference to FIG. 8.

In step 704, the computer system extracts features from training datasets obtained from offset wells. The training datasets include wireline logs, logging while drilling logs, bit vibrations, drilling parameters, elastic properties of geological formations obtained from core data, identified geological formations, and geological interpretations. In step 708, the computer system trains the machine learning regression algorithm to determine the usefulness of the extracted features in predicting the elastic properties of a geological formation. The machine learning regression algorithm uses a drilling environment classification corresponding to the extracted features and reference (expected) values of elastic properties as input during the training process illustrated in FIG. 7. In some implementations, the drilling environment classification is used to determine the type of geological formation.

In step 712, the computer system generates an optimal subset of the extracted features based on the determined usefulness of the extracted features in predicting the elastic properties of the geological formation. The training process illustrated in FIG. 7 can be modified when particular input data to the machine learning regression algorithm is missing. For example, a logging while drilling log may not be available. As a result, the training process provides a set of machine learning regression algorithms that can be applied in accordance with the availability of data during an actual drilling project. In step 716, the computer system updates the internal parameters of the machine learning regression algorithm based on the generated optimal subset of extracted features and the reference (expected) elastic properties used as ground truth. For example, the weights of the machine learning models and the configuration variables are updated if an artificial neural network is used. If a support vector machine is used, the support vectors are updated.

In step 720, the computer system computes a regression accuracy metric for the updated machine learning regression algorithm based on the reference (expected) elastic properties, as described in more detail with reference to FIG. 6. If the regression accuracy metric has not increased beyond a third threshold accuracy, the computer system generates the internal parameters of the present machine learning regression algorithm and the optimal subset of extracted features as output in step 724. The regression accuracy metric represents the extent to which the predicted elastic properties match the reference (expected) values. The third threshold accuracy can be expressed as a percentage value, such as 10%. If the regression accuracy metric has indeed increased beyond the third threshold accuracy, the computer system updates the internal parameters of the present machine learning regression algorithm in step 728. As described in more detail with reference to FIG. 6, the regression accuracy metric is a specific quantitative metric of the goodness-of-fit. The goodness of fit defines the extent to which the determined elastic properties match the reference (expected) value. For example, the goodness of fit can be a value ranging from 0 to 1, such as 0.78. Here, the value 0 indicates that the determined elastic properties do not match the reference (expected) value. The value 1 indicates that the determined elastic properties exactly match the reference (expected) value. The process illustrated in FIG. 7 terminates when the goodness of fit is reached in step 720.

The implementation of the process illustrated in FIG. 7 assumes that the machine learning regression algorithm is pre-defined and is used for preparation of the predictive features, determination of the usefulness of the features, and computation of the regression accuracy metric. The computer system trains the machine learning regression algorithm to identify a set of parameters from the drilling parameters, the logging while drilling log, and the bit vibrations. The identified parameters are used to select features for the second feature vector from the data acquired during drilling based on the drilling environment classification and the selected machine learning regression algorithm. The second feature vector is described in more detail with reference to FIG. 1. The training process illustrated in FIG. 7 determines an optimal subset of the features and updates the internal parameters of the machine learning regression algorithm. If several machine learning regression algorithms appear to be accurate, the process illustrated in FIG. 7 is iteratively applied to each of the machine learning regression algorithms to select an optimal machine learning regression algorithm based on the regression accuracy metric.

In a first experiment, the disclosed implementations were applied to a sample dataset of three hydrocarbon production wells using the process illustrated in FIG. 6. Identification of the geological formations were performed. The three hydrocarbon production wells were drilled by the same rig and used a similar drilling program. Thus, factors that could cause discrepancies in the drilling parameters were eliminated. The sample dataset used includes surface drilling parameters recorded at the drilling rig as well as wireline Gamma Ray values acquired in an open-hole section of the boreholes. In a first region, a first feature (log(MSE)/log(Sq)) was found to be more useful than a second feature (log(GR)) for predicting elastic properties (step 612 illustrated in FIG. 6). Here, "MSE" denotes the mean specific energy and "GR" denotes the intensity of passive Gamma Ray radiation measured by a logging while drilling tool. The value of Sq is computed as follows.

$$Sq = 4\sqrt{\pi}\frac{WOB \times RPM}{\sqrt{A_B} \times ROP} \qquad (2)$$

In a second region, the first feature (log(MSE)/log(Sq)) was found to be less useful than the second feature (log(GR)). The distributions of the Gamma Ray values along the boreholes of the three hydrocarbon production wells were found to be similar, indicating similarity in the geological sections. The consistent signature of the first feature (log (MSE)/log(Sq)) in the geological formation indicates that the first feature can be used for identification of the geological formation while drilling in the first region (step 612 illustrated in FIG. 6). The signature of the second feature (log(GR)) indicates that the second feature is more likely to be used by a machine learning classification algorithm in the second region.

In the first experiment, a machine learning classification algorithm was trained using data from the first two hydrocarbon production wells. The machine learning classification algorithm was used to generate a pointwise prediction of the geological formation type for the third hydrocarbon production well. More specifically, a random forest algorithm was used that relies on prediction by an ensemble of decision trees. During training, the machine learning classification algorithm identified informative splits relative to features characterizing the presence of drilling inefficiencies in the third hydrocarbon production well. The drilling inefficiencies cause less than a majority of the energy applied to be used for destruction of the rock. The computer system determined classifications for thirteen geological formations using drilling parameters and wireline Gamma Ray logs. An assumption was made that the logging while drilling logs indicate comparable measurements. The reference (expected) values of the geological formations were determined using wireline logs. More than a hundred different features were generated from the drilling parameters. In order to reduce noise (outliers) in the input data, the input data was smoothed in a thirty meter window.

In the first experiment, the random forest algorithm determined the usefulness of each extracted feature after each training cycle was performed (step 612 illustrated in FIG. 6). An optimal subset of the features was used to preclude overfitting (step 616 illustrated in FIG. 6). The experiment resulted in an optimal subset of features that included six features (step 632 illustrated in FIG. 6). In order of ascending importance, the optimal subset of features determined were (1) log(WOB), (2) log(TOR/RPM), (3) log(MSE), (4) log(MSE)/log(Sq), (5) log(ROP), and (6) log(GR). Here, "log(X)" denotes the natural logarithm of a value X, "WOB" denotes the weight on bit, "TOR" denotes the torque measured at the drilling rig, "RPM" denotes the revolutions per minute, "MSE" denotes the mean specific energy, Sq is a variable determined using equation (2), "ROP" denotes the rate of penetration, and "GR" denotes the intensity of passive Gamma Ray radiation measured by a logging while drilling tool.

In the first experiment, the computer system determined that the accuracy metric for identifying geological formations and the upper layers of geological formations increases when bit vibrations are available. The bit vibrations are described in more detail with reference to FIG. 1. In addition to the extracted features from the drilling parameters, features from the downhole vibration recordings (such as waveforms or spectrograms) were used. The machine learning techniques disclosed with reference to FIGS. 1 and 3-5 were used to automatically extract features and identify patterns in the input data. The application of recurrent neural networks or dilated convolutional neural networks enabled time dependencies in the data to be captured.

A second experiment was conducted on the three hydrocarbon production wells using the process illustrated in FIG. 1 to compare the determined compressional velocity using machine learning to the reference (expected) compressional velocity of the geological formations. The computer system used training datasets from the first two hydrocarbon production wells to create linear regression fits. The correlation coefficient between the predicted values for the third hydrocarbon production well and the reference values was determined to be 70%. When the geological formation identification (step 108 illustrated in FIG. 1) was omitted, the linear regression provided only 10% correlation (no predictive value). A further variation of the process illustrated in FIG. 1 was performed. Such a variation is useful when a different bottomhole assembly or a different rig is used. First, the drilling environment classification was identified (step 108 illustrated in FIG. 1). Then, the computer system performed a different regression for the geological formation identified for each drilling regime. In this manner, the masking effects of drilling inefficiencies on the drilling parameters were eliminated. The computer system determined that the geological formation types and the upper layers of the geological formations correlate to the features extracted from the drilling parameters.

In a third experiment, the computer system used the process illustrated in FIG. 7 to compare the determined shear velocities with reference (expected) shear velocities. The third experiment included regression training within a particular drilling class (step 720 in FIG. 7). The dataset used included bit vibrations, logging while drilling logs (such as a Gamma Ray log or a Neutron log), and the drilling parameters. The input dataset was acquired in a section of a production well having intersecting intervals with different lithology—carbonates, sandstones, and anhydrites. The different lithology causes a significant scatter of the shear velocity values in the interval. The interval was interpreted as a single geological formation. Regressions were performed for the entire interval to provide the shear velocity based on the bit vibrations, logging while drilling log, and drilling parameters. Two different multilinear regressions were performed using backward/forward stepwise regression. The first regression was determined to be a better predictor of the shear velocity, indicating that the machine learning algorithms are indeed able to determine the regression accuracy metric and provide accurate values of elastic properties.

In the third experiment, the bit vibrations in the datasets were further transformed into continuous variables associated with the properties of the geological formations. The Fourier spectrum of the axial accelerometer used contains three distinct frequency intervals: (1) 0.1-35 Hertz (Hz), (2) 35-170 Hz, and (3) 170-500 Hz. The first frequency interval (0.1-35 Hz) is dominated by signals introduced by drill bit rotation. The second frequency interval (35-170 Hz) includes signals from interaction between the drill bit and rock. The third frequency interval (170-500 Hz) corresponds to eigenmodes in the drillstring and bottom hole assembly. In the regression training performed, the Root Mean Square (RMS) average of the recorded vibrations in the moving 30 second windows was computed for the downhole-recorded accelerations. The RMS average values were computed along the Z-axis ("dacz"), filtered in the three frequency intervals as RMSdaczi (0.1-35 Hz), RMSdacz2 (35-170 Hz), and RMSdacz3 (170-500 Hz). The drilling parameters and logging while drilling data provided the same six features that were described previously with reference to the first experiment. The features are (1) log(WOB), (2) log(TOR/RPM), (3) log(MSE), (4) log(MSE)/log(Sq), (5) log(ROP), and (6) log(GR). Thus, consistency in the output from the machine learning algorithms was achieved. The three additional features (log(RMSdaczi), log(RMSdacz2), and log (RMSdacz3)) and a constant term were added to the subset of features to assemble a total of ten linear features. The space of geological models can thus be searched using stepwise regression techniques based on the ten features. The goodness-of-fit is measured by $R^2$.

Figure 8:
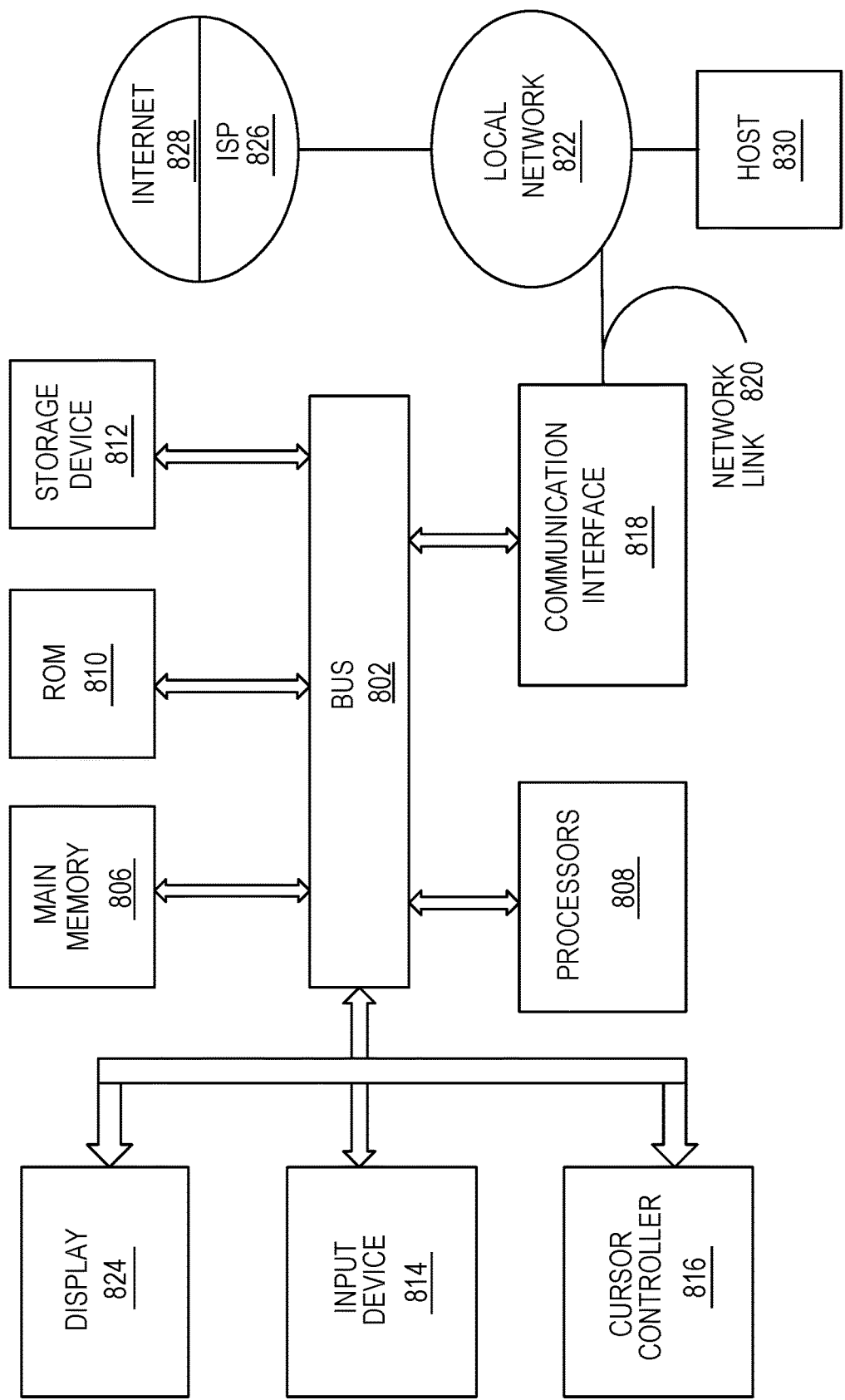
FIG. 8 illustrates an example machine for determining elastic properties of a geological formation, in accordance with one or more implementations.

FIG. 8 illustrates an example machine for determining elastic properties of a geological formation, in accordance with one or more implementations. In the example implementation, the computer system is a special purpose computing device. The special-purpose computing device is hard-wired or includes digital electronic devices such as one or more application-specific integrated circuits (ASICs) or field programmable gate arrays (FPGAs) that are persistently programmed to perform the techniques herein, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system includes a bus 802 or other communication mechanism for communicating information, and one or more computer hardware processors 808 coupled with the bus 802 for processing information. The hardware processors 808 are, for example, general-purpose microprocessors. The computer system also includes a main memory 806, such as a random-access memory (RAM) or other dynamic storage device, coupled to the bus 802 for storing information and instructions to be executed by processors 808. In one implementation, the main memory 806 is used for storing temporary variables or other intermediate information during execution of instructions to be executed by the processors 808. Such instructions, when stored in non-transitory storage media accessible to the processors 808, render the computer system into a special-purpose machine that is customized to perform the operations specified in the instructions.

In an embodiment, the computer system further includes a read only memory (ROM) 810 or other static storage device coupled to the bus 802 for storing static information and instructions for the processors 808. A storage device 812, such as a magnetic disk, optical disk, solid-state drive, or three-dimensional cross point memory is provided and coupled to the bus 802 for storing information and instructions.

In an embodiment, the computer system is coupled via the bus 802 to a display 824, such as a cathode ray tube (CRT), a liquid crystal display (LCD), plasma display, light emitting diode (LED) display, or an organic light emitting diode (OLED) display for displaying information to a computer user. An input device 814, including alphanumeric and other keys, is coupled to bus 802 for communicating information and command selections to the processors 808. Another type of user input device is a cursor controller 816, such as a mouse, a trackball, a touch-enabled display, or cursor direction keys for communicating direction information and command selections to the processors 808 and for controlling cursor movement on the display 824. This input device typically has two degrees of freedom in two axes, a first axis (e.g., x-axis) and a second axis (e.g., y-axis), that allows the device to specify positions in a plane.

According to one embodiment, the techniques herein are performed by the computer system in response to the processors 808 executing one or more sequences of one or more instructions contained in the main memory 806. Such instructions are read into the main memory 806 from another storage medium, such as the storage device 812. Execution of the sequences of instructions contained in the main memory 806 causes the processors 808 to perform the process steps described herein. In alternative embodiments, hard-wired circuitry is used in place of or in combination with software instructions.

The term "storage media" as used herein refers to any non-transitory media that store data or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 812. Volatile media includes dynamic memory, such as the main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but can be used in conjunction with transmission media. Transmission media participates in transferring information between storage media. For example, transmission media includes coaxial cables, copper wire and fiber optics, including the wires that include the bus 802. Transmission media can also take the form of acoustic or light waves, such as those generated during radio-wave and infrared data communications.

In an embodiment, various forms of media are involved in carrying one or more sequences of one or more instructions to the processors 808 for execution. For example, the instructions are initially carried on a magnetic disk or solid-state drive of a remote computer. The remote computer loads the instructions into its dynamic memory and send the instructions over a telephone line using a modem. A modem local to the computer system receives the data on the telephone line and use an infrared transmitter to convert the data to an infrared signal. An infrared detector receives the data carried in the infrared signal and appropriate circuitry places the data on the bus 802. The bus 802 carries the data to the main memory 806, from which processors 808 retrieves and executes the instructions. The instructions received by the main memory 806 can optionally be stored on the storage device 812 either before or after execution by processors 808.

The computer system also includes a communication interface 818 coupled to the bus 802. The communication interface 818 provides a two-way data communication coupling to a network link 820 that is connected to a local network 822. For example, the communication interface 818 is an integrated service digital network (ISDN) card, cable modem, satellite modem, or a modem to provide a data communication connection to a corresponding type of telephone line. As another example, the communication interface 818 is a local area network (LAN) card to provide a data communication connection to a compatible LAN. In some implementations, wireless links are also implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 provides a connection through the local network 822 to a host computer 830 or to a cloud data center or equipment operated by an Internet Service Provider (ISP) 826. The ISP 826 in turn provides data communication services through the world-wide packet data communication network now commonly referred to as the "Internet" 828. The local network 822 and Internet 828 both use electrical, electromagnetic or optical signals that carry digital data streams. The signals through the various networks and the signals on the network link 820 and through the communication interface 818, which carry the digital data to and from the computer system, are example forms of transmission media.

The computer system sends messages and receives data, including program code, through the network(s), the network link 820, and the communication interface 818. In an embodiment, the computer system receives code for processing. The received code is executed by the processors 808 as it is received, and/or stored in storage device 812, or other non-volatile storage for later execution.

What is claimed is:

1. A method comprising:
   extracting, by a computer system, a first feature vector from data acquired during drilling, the data acquired during drilling comprising drilling parameters representing surface and downhole parameters, wherein the first feature vector indicative of a drilling environment classification comprises a drilling dynamics of a drilling process, the drilling dynamics related to elastic properties of rock being drilled;
   determining, by a machine learning classification algorithm of the computer system, the drilling environment classification based on the first feature vector, wherein the determined of the drilling environment classification is used to select an appropriate machine learning regression algorithm to predict the elastic properties;
   selecting, by the computer system, the machine learning regression algorithm that satisfies a threshold accuracy from a plurality of machine learning regression algorithms based on the drilling environment classification;
   extracting, by the computer system, a second feature vector from the data acquired during drilling based on the determined drilling environment classification and the selected machine learning regression algorithm, the second feature vector indicative of the elastic properties of a geological formation;
   determining, by the selected machine learning regression algorithm, the elastic properties of the geological formation based on the second feature vector; and
   generating, on a display device of the computer system, a graphical representation of the elastic properties of the geological formation to enable drilling optimization and to refine a system of drilling classes.

2. The method of claim 1, wherein the data acquired during drilling further comprises at least one of a logging while drilling log or bit vibrations, the bit vibrations obtained using at least one of a near-bit downhole tool, vibration sensors in a drillstring, or vibration sensors at a surface of a well.

3. The method of claim 1, wherein the drilling environment classification is indicative of drilling instrumentation, a drilling regime, and the elastic properties of the geological formation.

4. The method of claim 1, wherein the drilling parameters represent at least one of surface drilling parameters or downhole drilling parameters, and wherein the drilling parameters comprise a rotational drilling speed, a mud motor speed, a rate of penetration, a drilling torque, an area of a drill bit, a weight on bit, a temperature of a drilling mud, a weight of the drilling mud, a nozzle diameter of the drill bit, and a number of cutters of the drill bit.

5. The method of claim 1, wherein the elastic properties comprise an unconfined compressive strength, a compressional velocity, a shear velocity, a density, a Young's modulus, and a Poisson's ratio.

6. The method of claim 1, further comprising training, by the computer system, the machine learning classification algorithm to determine the drilling environment classification based on training data obtained from offset wells, the training data comprising wireline logs, logging while drilling logs, bit vibrations, the drilling parameters, elastic properties of geological formations obtained from core data, identified geological formation types, and geological interpretations.

7. The method of claim 1, further comprising training, by the computer system, the machine learning regression algorithm to determine the elastic properties based on training data obtained from offset wells, the training data comprising wireline logs, logging while drilling logs, bit vibrations, the drilling parameters, elastic properties of geological formations obtained from core data, identified geological formation types, and geological interpretations.

8. The method of claim 1, further comprising training, by the computer system, the machine learning classification algorithm to identify features of the second feature vector from the drilling parameters, a logging while drilling log, and bit vibrations, the training based on wireline logs, logging while drilling logs, bit vibrations, the drilling parameters, elastic properties of geological formations obtained from core data, identified geological formation types, and geological interpretations.

9. A non-transitory computer-readable storage medium storing instructions executable by a computer system, the instructions when executed by the computer system cause the computer system to:
   extract a first feature vector from data acquired during drilling, the data acquired during drilling comprising drilling parameters representing surface and downhole parameters, wherein the first feature vector indicative of a drilling environment classification comprises a drilling dynamics of a drilling process, the drilling dynamics related to elastic properties of rock being drilled;
   determine, by a machine learning classification algorithm of the computer system, the drilling environment classification based on the first feature vector, wherein the determined of the drilling environment classification is used to select an appropriate machine learning regression algorithm to predict the elastic properties;
   select the machine learning regression algorithm that satisfies a threshold accuracy from a plurality of machine learning regression algorithms based on the drilling environment classification;
   extract a second feature vector from the data acquired during drilling based on the determined drilling environment classification and the selected machine learning regression algorithm, the second feature vector indicative of the elastic properties of a geological formation;
   determine, by the selected machine learning regression algorithm, the elastic properties of the geological formation based on the second feature vector; and
   generating, on a display device of the computer system, a graphical representation of the elastic properties of the geological formation to enable drilling optimization and to refine a system of drilling classes.

10. The non-transitory computer-readable storage medium of claim 9, wherein the data acquired during drilling further comprises at least one of a logging while drilling log or bit vibrations, the bit vibrations obtained using at least one of a near-bit downhole tool, vibration sensors in a drillstring, or vibration sensors at a surface of a well.

11. The non-transitory computer-readable storage medium of claim 9, wherein the drilling environment classification is indicative of drilling instrumentation, a drilling regime, and the elastic properties of the geological formation.

12. The non-transitory computer-readable storage medium of claim 9, wherein the drilling parameters represent at least one of surface drilling parameters or downhole drilling parameters, and wherein the drilling parameters comprise a rotational drilling speed, a mud motor speed, a rate of penetration, a drilling torque, an area of a drill bit, and a weight on bit, a temperature of a drilling mud, a weight of the drilling mud, a nozzle diameter of the drill bit, and a number of cutters of the drill bit.

13. The non-transitory computer-readable storage medium of claim 9, wherein the elastic properties comprise an unconfined compressive strength, a compressional velocity, a shear velocity, a density, a Young's modulus, and a Poisson's ratio.

14. The non-transitory computer-readable storage medium of claim 9, wherein the instructions further cause the computer system to train the machine learning classification algorithm to determine the drilling environment classification based on training data obtained from offset wells, the training data comprising wireline logs, logging while drilling logs, bit vibrations, the drilling parameters, elastic properties of geological formations obtained from core data, identified geological formation types, and geological interpretations.

15. The non-transitory computer-readable storage medium of claim 9, wherein the instructions further cause the computer system to train the machine learning regression algorithm to determine the elastic properties based on training data obtained from offset wells, the training data comprising wireline logs, logging while drilling logs, bit vibrations, the drilling parameters, elastic properties of geological formations obtained from core data, identified geological formation types, and geological interpretations.

16. The non-transitory computer-readable storage medium of claim 9, wherein the instructions further cause the computer system to train the machine learning classification algorithm to identify features of the second feature vector from the drilling parameters, a logging while drilling log, and bit vibrations, the training based on wireline logs, logging while drilling logs, bit vibrations, the drilling parameters, elastic properties of geological formations obtained from core data, identified geological formation types, and geological interpretations.

17. A computer system comprising:
one or more computer processors; and
a non-transitory computer-readable storage medium storing instructions executable by the one or more computer processors, the instructions when executed by the one or more computer processors cause the one or more computer processors to:
extract a first feature vector from data acquired during drilling, the data acquired during drilling comprising drilling parameters representing surface and downhole parameters, wherein the first feature vector indicative of a drilling environment classification comprises a drilling dynamics of a drilling process, the drilling dynamics related to elastic properties of rock being drilled;
determine, by a machine learning classification algorithm of the computer system, the drilling environment classification based on the first feature vector, wherein the determined of the drilling environment classification is used to select an appropriate machine learning regression algorithm to predict the elastic properties;
select the machine learning regression algorithm that satisfies a threshold accuracy from a plurality of machine learning regression algorithms based on the drilling environment classification;
extract a second feature vector from the data acquired during drilling based on the determined drilling environment classification and the selected machine learning regression algorithm, the second feature vector indicative of the elastic properties of a geological formation;
determine, by the selected machine learning regression algorithm, the elastic properties of the geological formation based on the second feature vector; and
generating, on a display device of the computer system, a graphical representation of the elastic properties of the geological formation to enable drilling optimization and to refine a system of drilling classes.

18. The computer system of claim 17, wherein the data acquired during drilling further comprises at least one of a logging while drilling log or bit vibrations, the bit vibrations obtained using at least one of a near-bit downhole tool, vibration sensors in a drillstring, or vibration sensors at a surface of a well.

19. The computer system of claim 17, wherein the drilling environment classification is indicative of drilling instrumentation, a drilling regime, and the elastic properties of the geological formation.

20. The computer system of claim 17, wherein the drilling parameters represent at least one of surface drilling parameters or downhole drilling parameters, and wherein the drilling parameters comprise a rotational drilling speed, a mud motor speed, a rate of penetration, a drilling torque, an area of a drill bit, and a weight on bit, a temperature of a drilling mud, a weight of the drilling mud, a nozzle diameter of the drill bit, and a number of cutters of the drill bit.

* * * * *